(12) United States Patent
Syrjärinne et al.

(10) Patent No.: US 6,570,533 B2
(45) Date of Patent: May 27, 2003

(54) METHOD FOR DETERMINING THE PHASE OF INFORMATION, AND AN ELECTRONIC DEVICE

(75) Inventors: Jari Syrjärinne, Tampere (FI); Harri Valio, Kämmenniemi (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/867,139

(22) Filed: May 29, 2001

(65) Prior Publication Data

US 2002/0003492 A1 Jan. 10, 2002

(30) Foreign Application Priority Data

May 30, 2000 (FI) .................................................. 001300

(51) Int. Cl.[7] ................................................ G01S 5/14
(52) U.S. Cl. ................................................ 342/357.12
(58) Field of Search .................. 342/357.06, 357.1, 342/357.12; 455/13.2

(56) References Cited

U.S. PATENT DOCUMENTS

| | | | |
|---|---|---|---|
| 3,742,498 A | 6/1973 | Dunn | 343/7.5 |
| 5,878,034 A | 3/1999 | Hershey et al. | 370/321 |
| 5,906,337 A | 5/1999 | Williams et al. | 244/158 R |
| 6,075,987 A * | 6/2000 | Camp et al. | 342/357.12 |
| 6,252,545 B1 | 6/2001 | Da et al. | 342/357.1 |
| 6,300,899 B1 * | 10/2001 | King | 342/357.12 |

FOREIGN PATENT DOCUMENTS

| | | |
|---|---|---|
| EP | 0166300 A3 | 1/1986 |
| EP | 1122553 A2 | 8/2001 |

* cited by examiner

Primary Examiner—Thomas H. Tarcza
Assistant Examiner—Fred H Mull
(74) Attorney, Agent, or Firm—Perman & Green, LLP

(57) ABSTRACT

The invention relates to a method for determining the phase of information modulated in a code-modulated signal transmitted by a satellite in a receiver (MS). In the method, at least partly the same information is transmitted from at least a first and a second satellite (SV1–SV4) substantially simultaneously, the code-modulated signal transmitted from at least the first and the second satellite (SV1–SV4) is received, and at least the received signal of the first satellite is demodulated to determine the transmitted information. The method further comprises at least a first acquisition step, in which the receiver is synchronized with the signal of at least the first satellite (SV1); a determination step, in which said demodulated signal of the first satellite (SV1) is used to determine the phase of information modulated in the signal; a computing step to compute the difference in propagation time of the signal transmitted by said first satellite (SV1) and the signal transmitted by the second satellite (SV2) from the satellite (SV1, SV2) to the receiver (MS); a second acquisition step, in which the receiver is synchronized with the signal of the second satellite on the basis of the difference in propagation time computed in the computing step; and an integration step to receive the signal of the second satellite and to integrate epochs of a certain length to improve the demodulatability of the signal.

42 Claims, 7 Drawing Sheets

METHOD FOR DETERMINING THE PHASE OF INFORMATION, AND AN ELECTRONIC DEVICE

BACKGROUND OF THE INVENTION

1. Field of the Invention

The present invention relates to a method for determining the phase of information modulated in a code-modulated signal transmitted by a satellite, using a receiver. At least some of the same information is transmitted from at least a first and a second satellite substantially simultaneously and the code-modulated signal transmitted from at least the first and the second satellite is received.

The invention also relates to a positioning system including at least two satellites, a positioning receiver, and means, in the receiver, for determining the phase of information modulated in a code-modulated signal transmitted by the satellites. In the positioning system at least partly the same information is arranged to be transmitted from first and second satellites substantially simultaneously. The receiver includes at least means for receiving the code-modulated signal transmitted from the first and the second satellite.

The invention further relates to a positioning receiver including means for receiving a code-modulated signal transmitted from at least a first and a second satellite, where at least partly the same information is being transmitted in a code-modulated signal from the first and the second satellite substantially simultaneously. The positioning receiver also includes means for determining the phase of information modulated in the code-modulated signal transmitted from the satellites.

The invention still further relates to an electronic device including a positioning receiver for receiving a code-modulated signal transmitted from at least a first and a second satellite, at least partly the same information being transmitted in a code-modulated signal from the first and the second satellite substantially simultaneously. The electronic device further includes means for determining the phase of information modulated in the code-modulated signal transmitted from the satellites.

2. Discussion of the Related Art

One known positioning system is the GPS system (Global Positioning System) which presently comprises more than 20 satellites, of which a maximum of 12 are simultaneously within the sight of a receiver. These satellites transmit e.g. Ephemeris data of the satellite, as well as data on the time of the satellite. A receiver used in positioning normally deduces its position by calculating the propagation time of a signal transmitted simultaneously from several satellites belonging to the positioning system to the receiver. For the positioning, the receiver must typically receive the signal of at least four satellites within sight to compute the position.

Each satellite of the GPS system transmits a ranging signal at a carrier frequency of 1575.42 MHz called L1. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, the modulation of these signals is performed with at least one pseudo random sequence. This pseudo random sequence is different for each satellite. As a result of the modulation, a code-modulated wideband signal is generated. The modulation technique used makes it possible in the receiver to distinguish between the signals transmitted from different satellites, although the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with a polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible to produce different C/A codes with an identical code generator. The C/A codes are thus binary codes whose chipping rate in the GPS system is 1.023 MHz. The C/A code comprises 1023 chips, wherein the code epoch is 1 ms. The L1 carrier signal is further modulated with navigation information at a bit rate of 50 bit/s. The navigation information comprises information about the health of the satellite, its orbit, time data, etc.

During their operation, the satellites monitor the condition of their equipment. The satellites may use for example so-called watch-dog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. Furthermore, in a situation in which the signal of more than four satellites can be received, different satellites can be weighted differently on the basis of the health data. Thus, it is possible to minimize the effect of errors on measurements, possibly caused by satellites which seem unreliable.

To detect the signals of the satellites and to identify the satellites, the receiver must perform acquisition, whereby the receiver searches for the signal of each satellite at the time and attempts to be synchronized and locked to this signal so that the data transmitted with the signal can be received and demodulated. After the acquisition, the receiver attempts to keep locked, or to track the signal of the satellite at least during the time of positioning, but in some cases, the tracking phase can be maintained as long as the receiver receives the signal of the satellite sufficiently strongly.

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver. Also, in urban areas, buildings affect the signal to be received, and furthermore, so-called multipath propagation can occur, wherein the transmitted signal comes into the receiver along different paths, e.g. directly from the satellite (direct line-of-sight) and also reflected from buildings. This multipath propagation causes that the same signal is received as several signals with different phases.

The positioning arrangement has two primary functions:
1. to calculate the pseudo range between the receiver and the different GPS satellites, and
2. to determine the position of the receiver by utilizing the calculated pseudo ranges and the position data of the satellites. The position data of the satellites at each time can be calculated on the basis of the Ephemeris and time correction data received from the satellites.

The distances to the satellites are called pseudo ranges, because the time is not accurately known in the receiver. Thus, the determinations of position and time are iterated until a sufficient accuracy is achieved with respect to time and position. Because time is not known with absolute precision, the position and the time must be determined e.g. by linearizing a set of equations for each new iteration.

The pseudo range can be calculated by measuring the pseudo transmission time delays between signals of different satellites. After the receiver has been synchronized with the received signal, the information transmitted in the signal is determined.

FIG. 1b shows, in a reduced principle view, the determination of the code phase and the frequency deviation on the basis of the received signal by dividing a two-dimensional code phase and frequency space into cells C11, C12, ..., C1n, ..., Cm1, ..., Cmn. The code phase is shown in the horizontal direction and the frequency deviation in the vertical direction. One cell E to be searched is shown darker, and an advantageous direction of searching is illustrated with an arrow D. In this example, one square, in the horizontal direction, indicates a half bit and, in the vertical direction, a frequency range Δf to be examined at a time. It is obvious that the chart shown in the example of FIG. 1b is considerably reduced. In practice, there may be cells to be searched on as many as 2046 time levels and on 20 freqency levels, wherein the space to be searched comprises 40,920 cells. If it takes e.g. approximately 1 ms to examine one cell, this means in practice that it takes more than 40 seconds to scan the whole space to be searched.

Almost all known GPS receivers utilize correlation methods for calculating the distances. In a positioning receiver, reference codes ref(k), i.e. the pseudo random sequences for different satellites are stored or generated locally. A received signal is subjected to conversion to an intermediate frequency (down conversion), after which the receiver multiplies the received signal with the stored or replicated pseudo random sequence. The signal obtained as a result of the multiplication is integrated or low-pass filtered, wherein the result is data about whether the received signal contained a signal transmitted by a satellite. The multiplication is iterated in the receiver so that each time, the phase of the pseudo random sequence stored in the receiver is shifted. The correct code phase is inferred from the correlation result preferably so that when the correlation result is the greatest, the correct phase has been found. Thus, the receiver is correctly synchronized with the received signal. However, this method is relatively slow, particularly at weak signal strengths, since the weaker the signal to be examined is, the more code epochs must be used in computing the correlation. In some receivers of prior art, the acquisition of the receiver has been made faster by increasing the number of correlators. For example, 36 correlators have been used in a 12-channel receiver, and in some cases even 240 correlators are in use. Thus, the searching may become faster, but on the other hand, the arrangement makes the structure of the positioning receiver more complicated and may significantly increase the power consumption.

Under poor signal conditions, the level of the received signal is so weak that it is not easy to find out the data transmitted in the signal from the signal of one code epoch (approx. 1 ms). An attempt can be made to increase the signal to be used for correlation to multiples of code epochs, i.e. to several milliseconds. However, the extension of the correlation time is limited by the accuracy of the local oscillator of the receiver as well as by the fact that navigation data is modulated in the signal. If the accuracy of the local oscillator is not sufficient, it is not possible to integrate the signal received during the time of several code epochs in a coherent way. Incoherent integration does, in turn, not improve the signal to noise ratio as much as could be possible to achieve by coherent integration. In practice, receivers can achieve receiving times not greater than in the order of 20 ms in coherent integration. The navigation data modulated in the signal will cause that if the points of change in the data are not known, coherent integration is not useful, since the bit can change during the integration. Thus, if several code epochs are utilized in the correlation, the point of bit change in the navigation data should be found out, after which only such code epochs can be used in the correlation in which the bit value is the same, i.e. the code used in the modulation has the same phase throughout the correlation time. This should be considered both at the stage of acquisition and at the stage of tracking.

After the code acquisition has been completed, the next steps are frequency tuning and phase locking. This correlation result also indicates the information transmitted in the GPS signal.

The above-mentioned acquisition and frequency control process must be performed for each signal of a satellite received in the receiver. Some receivers may have several receiving channels, wherein an attempt is made on each receiving channel to be synchronized with the signal of one satellite at a time and to find out the information transmitted by this satellite.

A positioning receiver receives information transmitted by satellites and performs positioning on the basis of the received information. For the positioning, the receiver must receive the signal transmitted by at least four different satellites to find out the x, y, z coordinates and the time data, if none of this information is available for use by the receiver in a sufficiently reliable way. In some cases, it is possible to transmit, e.g. from a base transceiver station, the height data of the base station, wherein for the positioning it is sufficient that the receiver receives the signal transmitted by three satellites. Inaccuracies of a few meters in the height direction do not significantly impair the positioning accuracy. The received navigation information is stored in a memory, wherein of this stored information e.g. Ephemeris data of satellites can be used.

FIG. 1a shows, in a principle chart, positioning by means of a signal transmitted by four satellites SV1, SV2, SV3, SV4, and a reference receiver BS, in a positioning receiver MS. In the GPS system, satellites transmit Ephemeris data and time data, which can be used in the positioning receiver for computing to determine the position of the satellite at the time. These Ephemeris data and time data are transmitted in frames which are further divided into subframes. FIG. 2 shows an example of such a frame structure FR. In the GPS system, each frame comprises 1500 bits which are divided into five subframes of 300 bits each. Since the transmission of one bit takes 20 ms, the transmission of each subframe thus takes 6 s, and the whole frame is transmitted in 30 seconds. The subframes are numbered from 1 to 5. In each subframe 1, e.g. time data is transmitted, indicating the moment of transmission of the subframe as well as information about the deviation of the satellite clock with respect to the time in the GPS system.

The subframes 2 and 3 are used for the transmission of Ephemeris data. The subframe 4 contains other system information, such as universal time, coordinated (UTC). The subframe 5 is intended for the transmission of almanac data on all the satellites. The entity of these subframes and frames is called a GPS navigation message which comprises 25 frames, or 125 subframes. The length of the navigation message is thus 12 min 30 s.

In the GPS system, time is measured in seconds from the beginning of a week. In the GPS system, the moment of beginning of a week is midnight between a Saturday and a Sunday. Each subframe to be transmitted contains information on the moment of the GPS week when the subframe was transmitted. Thus, the time data indicates the moment of transmission of a certain bit, i.e. in the GPS system, the moment of transmission of the last bit in the subframe. In the satellites, time is measured with high-precision atomic chronometers. In spite of this, the operation of each satellite is controlled in a control centre for the GPS system (not shown), and e.g. a time comparison is performed to detect chronometric errors in the satellites and to transmit this information to the satellite.

In the receiver, the moment of transmission $\hat{T}_{ToA}^{k}$ of the received signal can be determined for example in the following way:

$$\hat{T}_{ToA}^{k} = TOW^{k} + T_{ms}^{k} + T_{chip}^{k} + T_{\Delta chip}^{k} \qquad (1)$$

in which $TOW^{k}$=the time data (time of week) contained in the last received subframe, $T_{ms}^{k}$=the time passed since the reception of the last received bit corresponding to the number of bits received after the last bit of the bit corresponding to the time data, i.e. in the GPS system the last bit of the last received subframe containing the time data, $T_{chip}^{k}$=the number (from 0 to 1022) of whole chips received after the change of the last epoch, $T_{\Delta chip}^{k}$=the code phase measured at the time of positioning, and k=the satellite index.

All the terms of Formula (1) to be added can be given in units of time (seconds). Further, the length of the chips and bits in time is known and it is substantially constant. As can be seen from Formula (1), only the last two terms in the determination of the moment of receiving a signal are related to the received signal as such. The other terms are related to information transmitted in this signal, and they are measured in relation to the received navigation data and the local reference time of the receiver.

The appended FIG. 3 illustrates this formula and its different terms, used for estimating the moment of receiving a signal received at a moment of positioning. It is obvious that FIG. 3 is simplified with respect to the real situation, because e.g. one code epoch comprises 1023 chips, wherein it is not reasonable to illustrate them in detail. The moment of positioning is illustrated by a dash-and-dot line indicated with the reference SM.

The measurement of the last two terms in Formula (1) requires that the receiver is properly synchronized and locked to this signal. It is thus possible in the receiver to determine each chip and its phase by using a satellite reference code stored or generated in the receiver, and a code phase loop.

It is important to calculate the moment of receiving the received signal for each signal to be tracked, because the local reference time of the receiver, formed by the local oscillator of the receiver, is coupled to the GPS time on the basis of these values. Furthermore, the different propagation times of signals received from different satellites can be deduced from these measured values, because each satellite transmits the same chip substantially at the same moment. Even though there may be minor differences in the timings of different satellites, they are monitored, and the error data is transmitted in the GPS navigation message, as was already mentioned above.

Under good receiving conditions and upon using an advantageous satellite constellation, the user's position and time error can be solved very accurately. A good satellite constellation means that the satellites to be used for positioning are selected so that seen from the receiver, they are clearly located in different directions, or the space angles at which the signals transmitted from different satellites arrive at the receiver are clearly different.

SUMMARY OF THE INVENTION

It is an aim of the present invention to provide a method for determining the position of a receiver also when the signal strength is so weak that navigation information cannot be received from the necessary four satellites. It is also an aim of the invention to provide a positioning receiver. The invention is based on the idea that in the positioning, the moment of bit change is determined preferably by means of one satellite with a signal which is received at a sufficient strength. It is thus possible to determine the moment of bit change from the signals of the other satellites on the basis of the relative differences in the times of receiving the signals from the different satellites, as well as almanac data, the estimated position of the receiver, and the reference time. The estimate used for the position of the receiver can be the position of the base transceiver station in whose operating range the receiver is located, i.e. the position of the so-called serving base station.

The method according to the present invention includes a first acquisition step, in which the receiver is synchronized with the signal of at least the first satellite, a determination step, in which a moment of a bit change of an information data bit in the modulated signal of the first satellite is used to determine the phase of information modulated in the signal, a computing step to compute the difference in propagation time of the signal transmitted by said first satellite and the signal transmitted by the second satellite from the satellite to the receiver, a second acquisition step, in which the receiver is synchronized with the signal of the second satellite on the basis of the difference in propagation time computed in the computing step, and an integration step to receive the signal of the second satellite and to integrate sequences of a certain length to improve the demodulability of the signal.

The positioning system according to the present invention—includes a first acquisition means for synchronizing the receiver at least with the signal of the first satellite, determining means for determining the phase of the information modulated in the signal of the first satellite on the basis of a moment of a bit change of an information data bit of the modulated signal, computing means for computing the difference in the time of propagation from the satellite to the receiver between the signal transmitted from the first satellite and the signal transmitted from the second satellite, second acquisition means for synchronizing the receiver with the signal of the second satellite on the basis of the difference in propagation time computed in the computing means, and integrating means for integrating sequences of a certain length from the received signal of the second satellite to improve demodulability of the signal.

The positioning receiver according to the present invention includes a first acquisition means for synchronizing the receiver at least with the signal of the first satellite, determining means for determining the phase of the information modulated in the signal of the first satellite on the basis of a moment of a bit change of an information data bit of the modulated signal, computing means for computing the difference in the time of propagation from the satellite to the receiver between the signal transmitted from the first satellite and the signal transmitted from the second satellite, second acquisition means for synchronizing the receiver with the signal of the second satellite on the basis of the difference in propagation time computed in the computing means, and integrating means for integrating epochs of a certain length from the received signal of the second satellite to improve demodulability of the signal.

The electronic device according to the present invention includes at least a first acquisition means for synchronizing the receiver at least with the signal of the first satellite, determining means for determining the phase of the information modulated in the signal of the first satellite on the basis of a moment of a bit change of an information data bit in the modulated signal, computing means for computing the difference in the time of propagation from the satellite to the receiver between the signal transmitted from the first satellite and the signal transmitted from the second satellite, second acquisition means for synchronizing the receiver with the signal of the second satellite on the basis of the difference in propagation time computed in the computing means, and integrating means for integrating epochs of a certain length from the received signal of the second satellite to improve demodulability of the signal.

Considerable advantages are achieved by the present invention when compared with methods and positioning receivers of prior art. When applying the method of the invention, positioning can also be performed when the signal strength of only one satellite is sufficiently strong. It is thus possible to determine the moment of bit change from the signals of the other satellites and to perform coherent integration of the signal for the time of several epochs without a bit change during the integration. The method of the invention can be used to reduce the time to first fix the receiver, e.g. when the receiver is turned on. The receiver can be synchronized very fast with the signal of one or more satellites that are sufficiently strong when received, and the synchronization with even weak signals of other satellites required can be significantly accelerated by the method of the invention. Moreover, in the method of the invention, the precise position of the receiver does not need to be computed, but a sufficient accuracy is a point in the vicinity of the receiver (in relation to the distance between the satellites and the receiver) whose position is known, e.g. the position of a base transceiver station. Thus, if navigation data, such as Ephemeris data and time data, has been received from at least one satellite in the receiver, no other information but this position data needs to be transmitted to the receiver. Furthermore, a sufficient accuracy for the reference clock is that the maximum error of the reference time is in the order of 2 min.

BRIEF DESCRIPTION OF THE DRAWINGS

In the following, the invention will be described in more detail with reference to the appended drawings, in which.

DETAILED DESCRIPTION OF THE PREFERRED EMBODIMENTS

Figure 7:
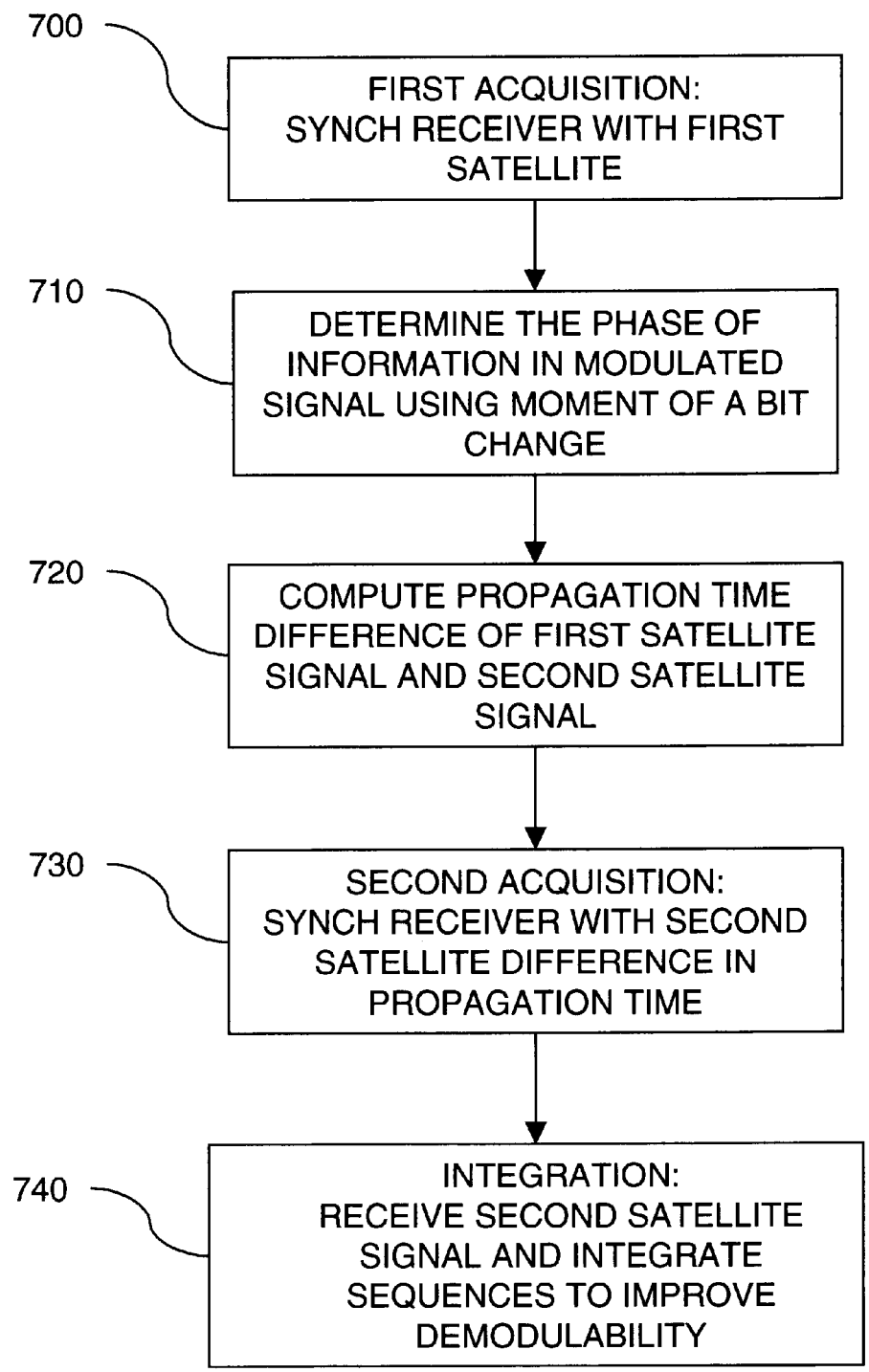

FIG. 7 shows a flow diagram of a method according to another preferred embodiment of the invention.

Figure 5:
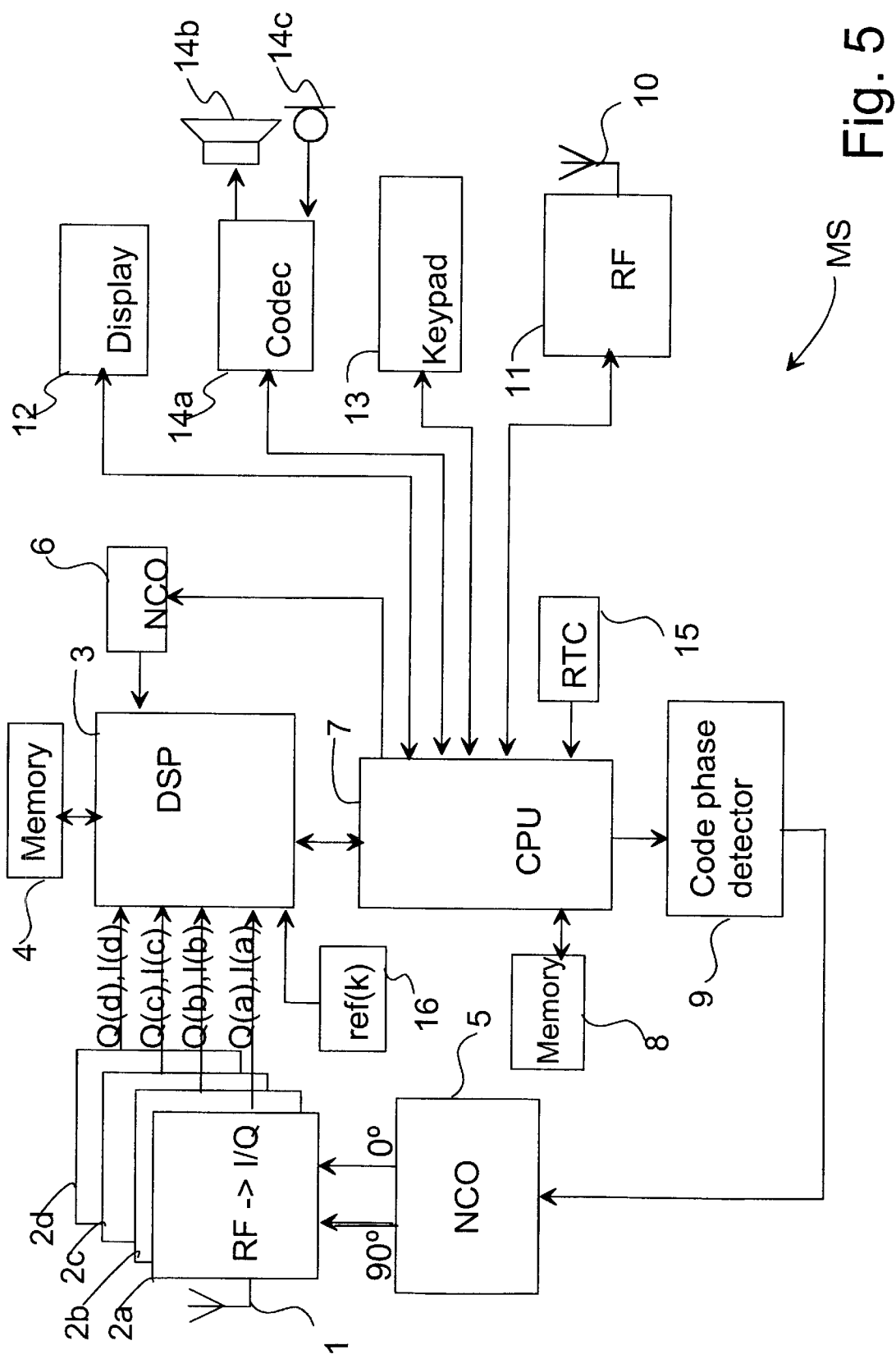
FIG. 5 shows, in a reduced block chart, a receiver in which the method according to the invention can be applied.

In a positioning receiver MS according to FIG. 5, a signal to be received via a first antenna 1 is converted preferably to an intermediate frequency or directly to a carrier frequency in a converter block. The receiver MS of FIG. 5 comprises four receiving channels, each having a common converter block, but it is obvious that the number of channels can also be different from that presented herein. The signal converted in the converter blocks to the intermediate frequency or carrier frequency comprises two components, known as such: I and Q components, with a phase difference of 90° therebetween. These analog signal components, converted to the intermediate frequency, are digitized. During the digitizing of the signal components, preferably at least one sample is taken of each chip, i.e. in the GPS system, at least 1,023,000 samples are thus taken in a second. Furthermore, the I and Q components of the digitized signal are multiplied by a signal formed with a first numerically controlled oscillator 5 (NCO). This signal of the first numerically controlled oscillator 5 is intended to correct a frequency deviation due to the Doppler shift and the frequency error of the local oscillator of the receiver 1. The signals formed in the converter block and indicated with the references Q(a), I(a)–Q(d),I(d) in FIG. 5, are preferably led to a digital signal processor 3. In block 16, also reference codes ref(k) are generated, corresponding to the codes used in code modulation of the satellites to be received. Using e.g. this reference code ref(k), the receiver MS attempts to find the code phase and frequency deviation of the signal of the satellite to be received on each receiving channel, to be used in operations after the synchronization.

A control block 7 is used to control e.g. a code phase detector 9 which is used to adjust the frequency of the numerically controlled oscillator 5, if necessary. The synchronization will not be described in more detail in this specification, but it is prior art known per se. After the receiving channel has been synchronized with the signal of a satellite SV1, SV2, SV3, SV4, it is possible to start demodulation and storage of the navigation information transmitted in the signal, if necessary. The digital signal processor 3 stores navigation information preferably in first memory 4. In the method according to the first preferred embodiment of the present invention, this navigation information does not need to be demodulated and stored, but the positioning receiver MS must determine the chip and code phase of the signals received from the satellites.

The positioning receiver MS also comprises means for performing the functions of the wireless device, such as a second antenna 10, a radio part 11, audio means, such as a codec 14a, a speaker 14b and a microphone 14c, a display 12, and a keypad 13.

Figure 1A:
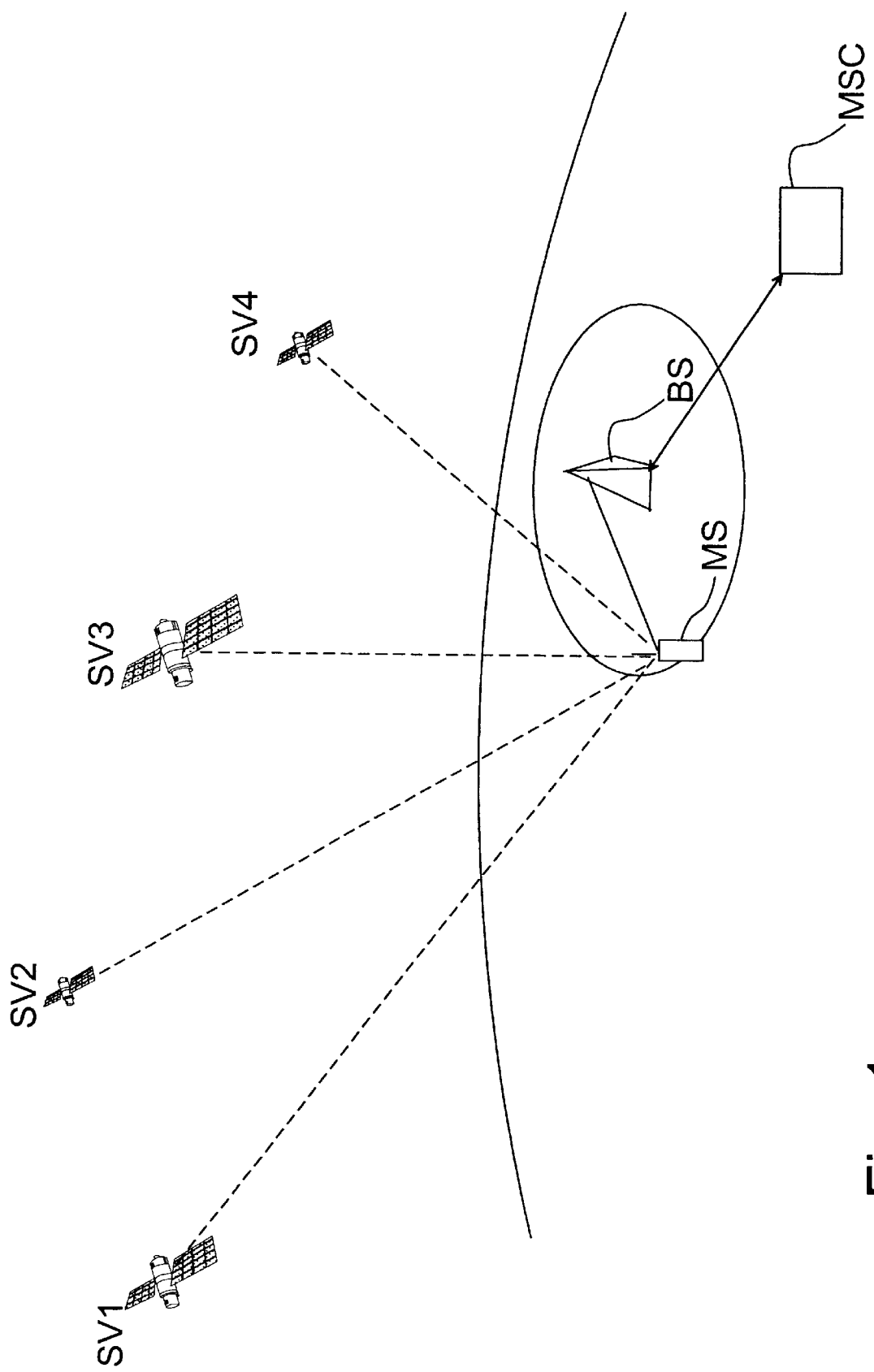
FIG. 1a shows, in a reduced principle chart, positioning by means of a signal transmitted from four satellites in a communication network.
Figure 6:
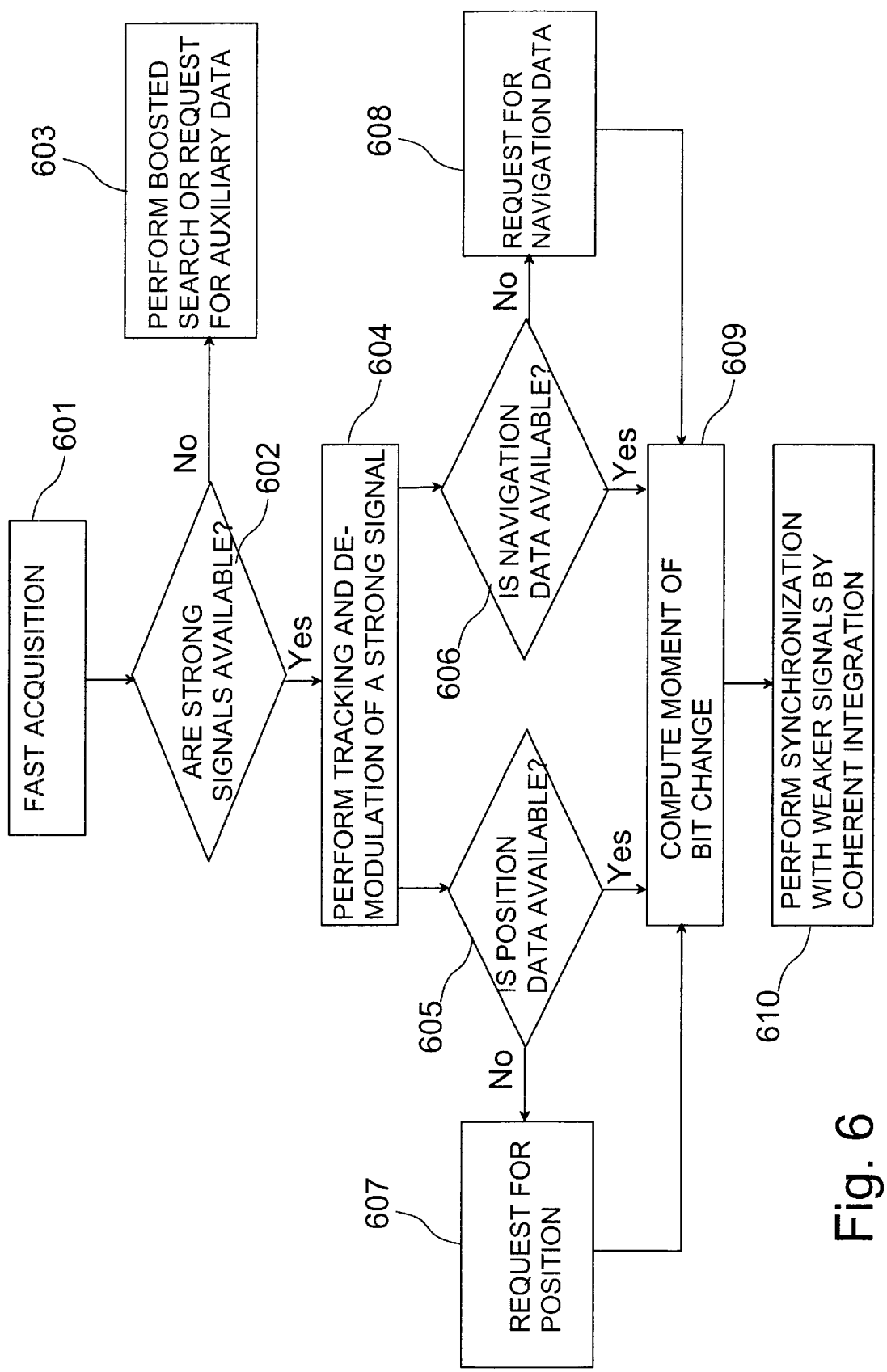
FIG. 6 shows, in a reduced flow chart, the method according to a preferred embodiment of the invention.

The following is a description on the operation of the method according to an advantageous embodiment of the invention, using the GPS satellite positioning system as an example, with reference to the flow chart of FIG. 6 and the example situation of FIG. 1a. It is assumed that the signal of one satellite, such as satellite SV1, is so strong when received in the receiver MS that the receiver MS can be synchronized with this signal and demodulate the navigation information encoded in the signal. Furthermore, it is assumed that acquisition to the other satellites SV2, SV3, SV4 within sight of the receiver MS at the moment fails and a sufficiently strong signal is not received for demodulating the navigation data. In the example situation of FIG. 1a, the receiver MS sees three other satellites SV2, SV3, SV4, but it is obvious that in practical situations, there can be more than four satellites within sight at a time. Thus, the receiver MS can, first of all, determine if the strength of the signal transmitted from any of these satellites SV1–SV4 within sight is sufficient for acquisition, and in case there is at least one such satellite, the receiver MS will preferably further determine which of the satellites within sight have an advantageous constellation in view of the positioning. This is illustrated with block 601 in the flow chart of FIG. 6.

After the receiver MS has detected (block 602) a sufficiently strong signal, the receiver MS will start acquisition and tracking of this signal of the satellite. This is preferably performed in such a way that signal receiving and code acquisition are started on one receiving channel of the receiver MS, e.g. on a first receiving channel, as presented above in connection with the description of the flow chart of FIG. 5. In the acquisition and tracking, it is possible to use methods known as such, e.g. correlators, time-to-frequency conversions, etc. If, however, no sufficiently strong signal can be received (block 603), the receiver may try to perform acquisition to a signal by using e.g. coherent integration for more than 1 ms.

After the acquisition, the receiver MS attempts to track the signal of the satellite, i.e. to keep synchronized with this signal (block 604). During the tracking, e.g. the digital signal processing unit in the receiver MS also demodulates the navigation information transmitted in the signal. The digital signal processing unit 3 stores navigation information preferably in the memory 4.

The receiver MS also examines if it has position data available (block 605), e.g. position data on a base transceiver station or position data related to the operating range of the base transceiver station (block 606). If any required data is not available at the receiver MS at the moment, the receiver retrieves this information. The receiver MS can request preferably a mobile communication network to transmit the position data (607), wherein e.g. the base station BS of the mobile communication network transmits position data to the receiver MS, preferably the position data of the base station BS serving the receiver MS at the moment. The position data can also be position data related to the operating range of the base station, e.g. the position coordinates of an object in the operating range. This position data can be stored e.g. in the base station BS, from which the position data can be transmitted to the receiver MS. This position data transmitted by the base station is used as a rough default value for the position of the receiver MS, because the distance between the receiver MS and the serving base station, or an object in the operating range of the serving base station, can be assumed to be insignificantly small, typically less than 30 km, when compared with the distance between the receiver MS and the satellites SV1–SV4. If the Ephemeris data and/or the time data are not available in the receiver, the receiver MS can request (608) also this information to be transmitted preferably from the mobile communication network.

After all the necessary information is available for the receiver, the bit change moments are calculated (609). The signal receiving moment $\hat{T}_{ToA}{}^k$ is calculated in the receiver MS preferably according to Formula (1). After the moment of receiving has been determined for one satellite SV1, also the positions of the other satellites SV2, SV3, SV4 within sight are calculated in the receiver MS. This can be performed preferably by calculating first the position of said one satellite SV1 at the moment of signal transmission by using the default position of the receiver MS, the moment of receiving calculated for the signal of said satellite SV1, the reference time data, and the navigation data received in the signal. After the position of said satellite SV1 at the moment of transmission has been calculated, the navigation data can be used to determine also the position and distance of the other satellites SV2–SV4 from the receiver MS at this moment of transmission of the signal. As all the satellites functioning in the system transmit the same signal substantially simultaneously, the signal propagation times from each satellite SV1–SV4 to the receiver MS can be calculated on the basis of the distance between the satellites SV1–SV4 and the receiver MS, as well as the signal propagation speed (in practice, the speed of light in a vacuum). It is thus possible to find out the difference in the signal propagation times from different satellites SV1–SV4 to the receiver MS. Since the receiver has information about the moment of receiving the signal transmitted from one satellite SV1, it is also possible, on the basis of said differences in propagation time, to calculate the differences in the moments of receiving the signals transmitted from the different satellites SV1–SV4. Because it has been assumed that the receiver MS has received from at least one satellite SV1 a sufficiently strong signal for acquisition and demodulation of navigation data, also the bit change points in the navigation data are known in the receiver MS. Thus, the corresponding bit change point is calculated in the receiver MS for the signals transmitted by the other satellites SV2–SV4. This information is utilized in the acquisition (610) of signals of the other satellites SV2–SV4 preferably in the following way.

The receiver MS receives the signal of the second satellite SV2 e.g. on the second receiving channel. For performing the acquisition, for example the control block 7 sets the moment of bit change calculated in the above-mentioned manner for the signal of this second satellite SV2 as the moment of starting coherent integration. The integration length can now be set to be substantially the same time as the length of one bit in the navigation data. In the GPS system, this time can be for example approximately 20 ms. Thus, signals of one chip (approximately 1 ms) are coherently integrated for this time of 20 ms. This will improve the signal to noise ratio with weak signals, because no bit status changes occur in the navigation data during coherent integration, wherein also the code phase of the chip will not change. The improved signal to noise ratio has e.g. the advantage that the receiver MS can perform acquisition and tracking more easily than is possible to achieve with solutions of prior art. It is naturally obvious that even this may not necessarily be sufficient in case of an extremely weak signal.

The above-mentioned coherent integration is performed on also the signals of the other satellites SV2–SV4 required for the positioning. After that, it is possible to make the required positioning calculations by a method known as such. Since these positioning calculations are prior art known as such by anyone skilled in the art, there is no need to discuss them in more detail in this context.

When applying the method according to the invention, it is also possible to use a longer integration time than the above-mentioned approximately 20 ms in coherent integration. For implementing this, navigation data demodulated from a strong satellite signal or received from a mobile communication network are preferably examined, as well as moments of bit change in a weak satellite signal. Since certain elements of information transmitted by the satellites are the same with the satellites belonging to the system, it is possible to reverse the phase on the basis of modulated data, if the bit value is changed. In practice, this operation can be considered analog with forming an absolute value. This method has the advantage that the time of coherent integration can be extended considerably longer than the time taken for transmitting one bit. In practice, an integration time of 100 ms can be achieved, and if the local oscillator of the receiver has sufficient phase stability, it is possible to use an integration time as long as several hundreds of milliseconds.

Figure 1B:
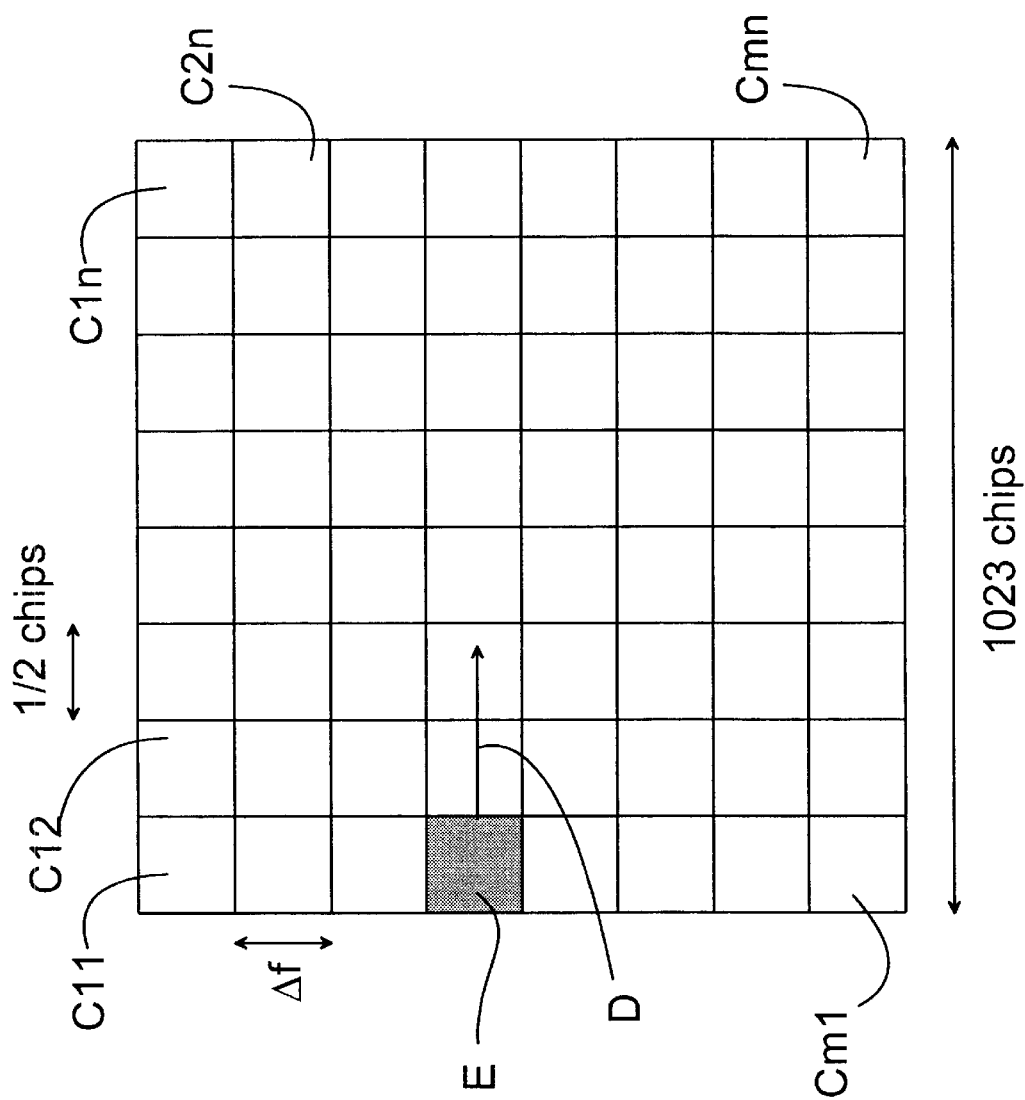
FIG. 1b shows, in a reduced principle chart, two-dimensional determination of the code phase and the frequency deviation from a signal transmitted from a satellite in a receiver.
Figure 2:
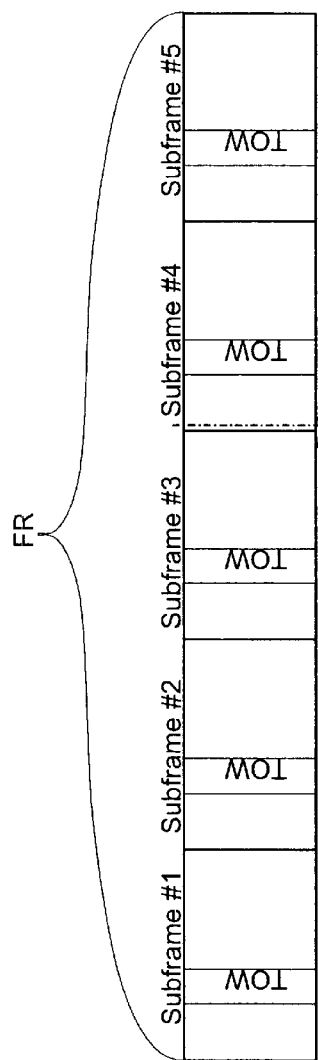
FIG. 2 shows an example of a frame structure used in the GPS system.
Figure 3:
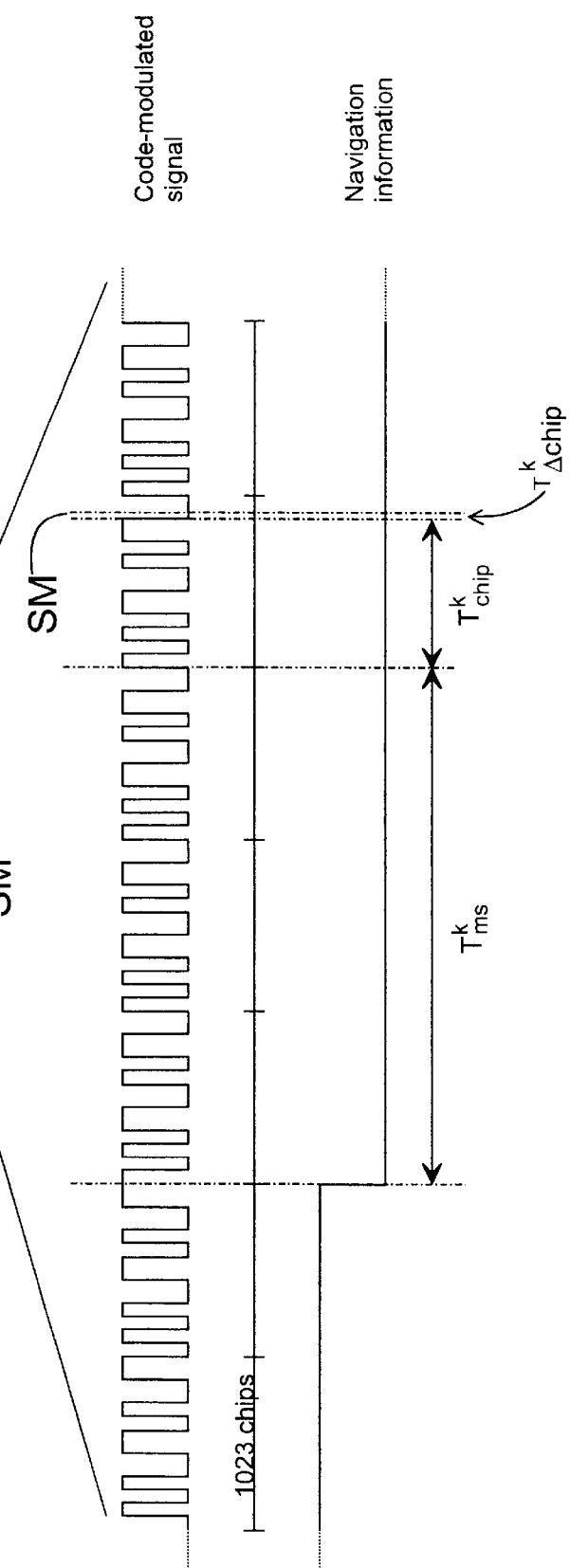
FIG. 3 illustrates a formula, with its different terms, according to prior art used for estimating the moment of receiving of a signal received at a moment of positioning.
Figure 4:
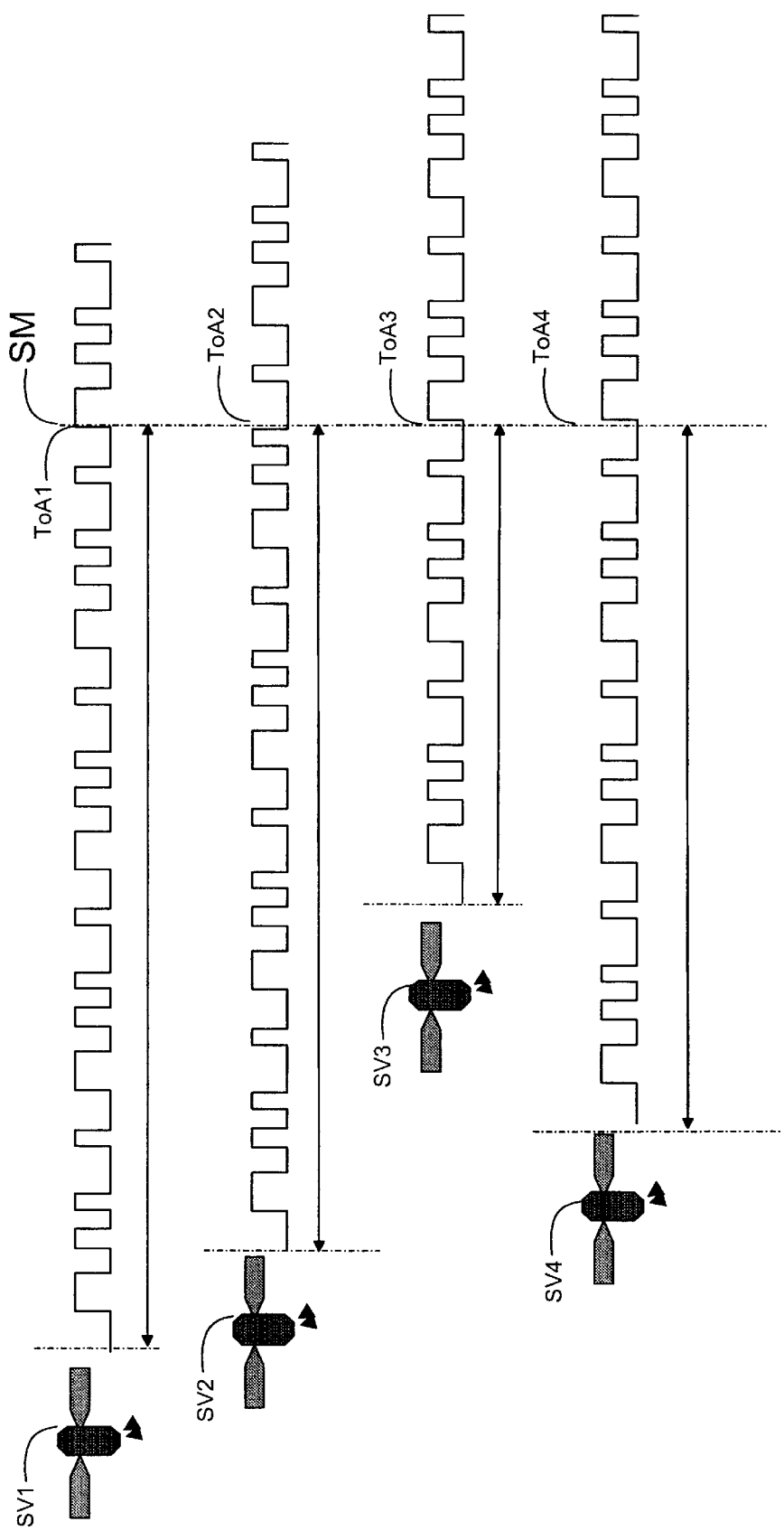
FIG. 4 illustrates differences in propagation time of signals from different satellites to a receiver.

FIG. 7 shows a flow diagram of a method according to another preferred embodiment of the invention. The method determines the phase of information modulated in a code-modulated signal transmitted by a satellite, where at least partly the same information is transmitted from at least a first and a second satellite (for example, SV1–SV4 of FIG. 1) substantially simultaneously, and the code-modulated signal transmitted from at least the first and the second satellite is received.

Block 700 shows a first acquisition step, in which the receiver is synchronized with the signal of at least the first satellite. Block 710 shows a determination step, in which a moment of a bit change of an information data bit in the modulated signal of the first satellite is used to determine the phase of information modulated in the signal. In block 720, the difference in propagation time of the signal transmitted by the first satellite and the signal transmitted by the second satellite is computed. Block 730 illustrates a second acquisition step, in which the receiver is synchronized with the signal of the second satellite on the basis of the difference in the computed propagation time. In block 740, an integration step includes receiving the signal of the second satellite and integrating sequences of a certain length to improve the demodulability of the signal.

When applying the method of the invention, the accuracy of the reference clock is not very significant. In practice, it will be sufficient that the time data of the reference clock has a maximum error of about 2 min in relation to the time data of the satellite system, i.e. the GPS time. Assuming that the rate of the satellite SV1–SV4 in relation to the receiver MS is in the order of 1 km/s, and error of two minutes will mean an error of ±180 km in the distance between the satellite and the receiver. If the position of a base station or the position data related to the operating range of the base station is used as the default position for the receiver, this will typically cause an error with a maximum of about 30 km, wherein when combined, these errors will cause an error with a maximum of about 200 km in the distance between the satelite and the receiver. Even if the error were in the order of 300 km, this will in the worst case mean a maximum error of ±1 ms in time, which can be considered insignificant in relation to the integration time of 20 ms.

In the following, some further example situations will be presented, in which the method according to the present invention can be advantageously applied.

When a positioning receiver MS is used outdoors, there are typically one to three such satellites at a time, from which the signal is directly received in the receiver MS (direct line of sight). The strenghts of the signals received directly are relatively high, wherein acquisition and tracking of them is relatively easy. However, three satellites do not suffice for reliable positioning. Thus, typically for at least one satellite, application of the method according to the invention will be needed for successful acquisition of the signal of this satellite. Factors affecting the strength of the signal received by the receiver MS include e.g. obstructions in the environment, such as buildings, topography, vegetation, and even the body of the user of the receiver MS.

Signals can be seldom received directly, substantially unattenuated, indoors. If there are one or more windows in the room, some of the signals may be received through a window, wherein such a signal is typically less attenuated than a signal received through a wall or the ceiling. Thus, in the method according to the invention, it is possible to try to use a signal received through a window as such a satellite signal on the basis of which the moments of bit change can be calculated for the signals of other satellites.

However, in a room with no windows, the situation is even more difficult, since all the signals are normally attenuated more than in a room with a window. In this case, however, the signals received through the ceiling may be attenuated less than signals received through the walls. In such a situation, a satellite whose signal is received in the receiver MS through the ceiling, can be used as a basis for calculating the moments of change.

It is obvious that the present invention is not limited solely to the embodiments presented above, but it can be modified within the scope of the appended claims.

What is claimed is:

1. A method for determining the phase of information modulated in a code-modulated signal transmitted by a satellite, in a receiver (MS), wherein at least partly the same information is transmitted from at least a first and a second satellite (SV1–SV4) substantially simultaneously, the code-modulated signal transmitted from at least the first and the second satellite (SV1–SV4) is received, characterized in that in the method, at least the following steps are taken:

a first acquisition step, in which the receiver is synchronized with the signal of at least the first satellite (SV1), a determination step, in which a moment of a bit change of an information data bit in the modulated signal of the first satellite (SV1) is used to determine the phase of information modulated in the signal, a computing step to compute the difference in propagation time of the signal transmitted by said first satellite (SV1) and the signal transmitted by the second satellite (SV2) from the satellite (SV1, SV2) to the receiver (MS), a second acquisition step, in which the receiver is synchronized with the signal of the second satellite on the basis of the difference in propagation time computed in the computing step, and an integration step to receive the signal of the second satellite and to integrate sequences of a certain length to improve the demodulability of the signal.

2. The method according to claim 1, characterized in that in the integration step, said signal sequences are coherently integrated.

3. The method according to claim 2, characterized in that said coherent integration is performed by adding said signal sequences.

4. The method according to claim 1, characterized in that the information transmitted contains at least Ephemeris data and time data of the satellites.

5. The method according to claim 4, characterized in that in the method, a default position is selected for the receiver (MS), the moment of receiving the signal transmitted from the first satellite is determined, and that the satellite Ephemeris data, the moment of receiving the signal and said default position are used to compute the differences in propagation time.

6. The method according to claim 5, in which information is also transmitted between the receiver (MS) and a base transceiver station (MS), characterized in that said at least one item of position data is transmitted from the base transceiver station (BS) to the receiver (MS), and that the position data transmitted from the base transceiver station (BS) is selected as said default position.

7. The method according to claim 6, characterized in that said position data relates to the operating range of said base transceiver station.

8. The method according to claim 6, characterized in that said position data is the position of said base transceiver station (BS).

9. The method according to claim 1, characterized in that the information transmitted is in binary format, wherein in the determination step for determining the phase of the information, at least the moment of change of one bit is determined.

10. The method according to claim 9, characterized in that for transmitting each bit, a certain number of code epochs are used, and that in the integration step, the number of code epochs integrated is substantially the same as the number of code epochs used for transmitting one bit.

11. The method according to claim 9, characterized in that a certain number of code epochs are used for transmitting each bit, and that in the integration step, a multiple of the number of code epochs used for transmitting one bit is integrated.

12. The method according to claim 11, characterized in that in the method, also the value of each bit is determined, wherein if the bit value is changed, phase reversal of the received signal is performed before the integration.

13. The method according to claim 11, characterized in that in the method, signals of satellites of the GPS system are received.

14. The method according to claim 13, characterized in that each code epoch is formed of a set of chips, that the length of one code epoch is 1023 chips, and that 20 code epochs are used for transmitting one bit.

15. The method according to claim 14, characterized in that 20 code epochs are used in the integration.

16. The method according to claim 14, characterized in that more than 20 code epochs are used in the integration.

17. The method according to claim 1, characterized in that in the method, at least one item of height data is determined, a signal is received from three satellites (SV1–SV4), that said height data is transmitted to the receiver, and that the position of the receiver is determined on the basis of signals transmitted by said three satellites (SV1–SV4) and said height data.

18. The method according to claim 17, in which information is also transmitted between the receiver (MS) and a base transceiver station (BS), characterized in that said height data used is the height data of said base transceiver station (BS).

19. The method according to claim 1, characterized in that in the method, a signal is received from at least four satellites (SV1–SV4), and that the position of the receiver is determined on the basis of signals transmitted by said four satellites (SV1–SV4).

20. The method according to claim 17, characterized in that in the method, also the strength of signals of satellites to be received in the receiver (MS) is measured; it is examined which satellites have a signal strength sufficient for performing modulation, wherein one satellite whose signal strength is sufficient for performing modulation is selected as said first satellite; and that said first acquisition step, determination step, computing step, second acquisition step, and integration step are taken for the signals of those satellites whose signal strength is not sufficient for performing demodulation without signal integration.

21. A positioning system comprising at least two satellites (SV1–SV4), a positioning receiver (MS), means for determining the phase of information modulated in a code-modulated signal transmitted by the satellites in the receiver (MS), in which system at least partly the same information is arranged to be transmitted from the first and the second satellite (SV1–SV4) substantially simultaneously, and which receiver comprises at least means for receiving the code-modulated signal transmitted from the first and the second satellite (SV1–SV4), characterized in that the positioning system further comprises at least:

first acquisition means for synchronizing the receiver at least with the signal of the first satellite (SV1), determining means for determining the phase of the information modulated in the signal of the first satellite (SV1) on the basis of a moment of a bit change of an information data bit of the modulated signal, computing means for computing the difference in the time of propagation from the satellite (SV1, SV2) to the receiver (MS) between the signal transmitted from said first satellite (SV1) and the signal transmitted from the second satellite (SV2), second acquisition means for synchronizing the receiver with the signal of the second satellite on the basis of the difference in propagation time computed in the computing means, and integrating means for integrating sequences of a certain length from the received signal of the second satellite to improve demodulability of the signal.

22. The positioning system according to claim 21, characterized in that said signal sequences are arranged to be coherently integrated.

23. The positioning system according to claim 22, characterized in that said coherent integration is arranged to be performed by adding said signal sequences.

24. The positioning system according to claim 21, characterized in that the information transmitted contains at least satellite Ephemeris data and time data.

25. The positioning system according to claim 24, characterized in that a default position is selected for the receiver (MS), wherein the positioning system comprises means for determining the moment of receiving a signal transmitted from the first satellite, and that the satellite Ephemeris data, the moment of receiving the signal and said default position are arranged to be used to compute the differences in propagation time.

26. The positioning system according to claim 25, further comprising means for transmitting information between the receiver (MS) and a base transceiver station (BS), characterized in that at least one item of position data is transmitted from said base transceiver station (BS) to the receiver (MS), and that said position data transmitted from the base transceiver station (BS) is selected as said default position.

27. The positioning system according to claim 26, characterized in that the position data transmitted from said base transceiver station (BS) relates to the operating range of said base transceiver station (BS).

28. The positioning system according to claim 26, characterized in that the position data transmitted from said base transceiver station (BS) is the position of said base transceiver station (BS).

29. The positioning system according to claim 21, characterized in that the transmitted information is in binary format, wherein at least the moment of change of one bit is arranged to be determined for determining the phase of information.

30. The positioning system according to claim 29, characterized in that a certain number of epochs is used for the transmission of each bit, and that a multiple of the number of code epochs used for the transmission of a bit is arranged to be used in the integration means.

31. The positioning system according to claim 30, characterized in that it further comprises means for determining the value of each bit, wherein if the bit value is changed, phase reversal is arranged to be performed on the received signal before the integration.

32. The positioning system according to claim 21, characterized in that the satellites (SV1–SV4) are satellites of the GPS system.

33. The positioning system according to claim 32, characterized in that the code epoch consists of a set of chips, that the length of one epoch is 1023 chips, and that 20 code epochs are used for the transmission of one bit.

34. The positioning system according to claim 33, characterized in that 20 code epochs are arranged to be used in the integration.

35. The positioning system according to claim 33, characterized in that more than 20 code epochs are arranged to be used in the integration.

36. The positioning system according to claim 21, characterized in that in the positioning system, at least one item of height data is determined in the positioning system, and that the positioning system comprises at least three satellites (SV1–SV4), means for transmitting said height data to the receiver (MS), and means for determining the position of the receiver on the basis of signals transmitted by said four satellites (SV1–SV4) and said height data.

37. The positioning system according to claim 36, which further comprises means for transmitting information between the receiver (MS) and a base transceiver station (BS), characterized in that said height data is the height data of said base transceiver station (BS).

38. The positioning system according to claim 21, characterized in that the positioning system comprises at least four satellites (SV1–SV4) and means for determining the position of the receiver on the basis of signals transmitted from said four satellites (SV1–SV4).

39. The positioning system according to claim 36, characterized in that it further comprises means for measuring signal strenghts; means for examining which satellites have a sufficient signal strength for performing demodulation, wherein one satellite whose signal strength is sufficient for performing demodulation is selected as said first satellite; and that the synchronization of the receiver with the signal of at least the first satellite (SV1), the determination of the phase of information modulated in the signal of the first satellite (SV1), the computation of the difference in the time of propagation between the signal transmitted by the first satellite (SV1) and the signal transmitted by the second satellite (SV2), the synchronization of the receiver with the signal of the second satellite, and the integration of sequences of certain length from the signal received from the second satellite are arranged to be performed for the signals of satellites whose signal strength is not sufficient for performing demodulation without integration of the signals.

40. A positioning receiver comprising means for receiving the code-modulated signal transmitted from at least a first and a second satellite (SV1–SV4), at least partly the same information being transmitted in a code-modulated signal from the first and the second satellite (SV1–SV4) substantially simultaneously, the positioning receiver further comprising means for determining the phase of information modulated in the code-modulated signal transmitted from the satellites, characterized in that the positioning system further comprises at least:

first acquisition means for synchronizing the receiver at least with the signal of the first satellite (SV1), determining means for determining the phase of the information modulated in the signal of the first satellite (SV1) on the basis of a moment of a bit change of an information data bit of the modulated signal, computing means for computing the difference in the time of propagation from the satellite (SV1, SV2) to the receiver (MS) between the signal transmitted from said first satellite (SV1) and the signal transmitted from the second satellite (SV2), second acquisition means for synchronizing the receiver with the signal of the second satellite on the basis of the difference in propagation time computed in the computing means, and integrating means for integrating epochs of a certain length from the received signal of the second satellite to improve demodulability of the signal.

41. An electronic device comprising a positioning receiver for receiving the code-modulated signal transmitted from at least a first and a second satellite (SV1–SV4), at least partly the same information being transmitted in a code-modulated signal from the first and the second satellite (SV1–SV4) substantially simultaneously, the electronic device further comprising means for determining the phase of information modulated in the code-modulated signal transmitted from the satellites, characterized in that the positioning system further comprises at least:

first acquisition means for synchronizing the receiver at least with the signal of the first satellite (SV1), determining means for determining the phase of the information modulated in the signal of the first satellite (SV1) on the basis of a moment of a bit change of an information data bit of the modulated signal, computing means for computing the difference in the time of propagation from the satellite (SV1, SV2) to the receiver (MS) between the signal transmitted from said first satellite (SV1) and the signal transmitted from the second satellite (SV2), second acquisition means for synchronizing the receiver with the signal of the second satellite on the basis of the difference in propagation time computed in the computing means, and integrating means for integrating epochs of a certain length from the received signal of the second satellite to improve demodulability of the signal.

42. The electronic device according to claim 41, characterized in that it comprises means for performing functions of a mobile station.

* * * * *